(12) United States Patent
Yamaoka et al.

(10) Patent No.: US 9,859,771 B2
(45) Date of Patent: Jan. 2, 2018

(54) MOTOR DEVICE

(71) Applicant: NIDEC SANKYO CORPORATION, Suwa-gun, Nagano (JP)

(72) Inventors: Mamoru Yamaoka, Nagano (JP); Yoshinori Ogawa, Nagano (JP); Takafumi Kasuga, Nagano (JP); Yuji Shingu, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 192 days.

(21) Appl. No.: 14/650,385

(22) PCT Filed: Feb. 28, 2014

(86) PCT No.: PCT/JP2014/054997
§ 371 (c)(1),
(2) Date: Jun. 8, 2015

(87) PCT Pub. No.: WO2014/133118
PCT Pub. Date: Sep. 4, 2014

(65) Prior Publication Data
US 2015/0357881 A1 Dec. 10, 2015

(30) Foreign Application Priority Data
Feb. 28, 2013 (JP) .................................. 2013-038071

(51) Int. Cl.
*H02K 7/116* (2006.01)
*H02K 7/08* (2006.01)
*F16D 3/04* (2006.01)

(52) U.S. Cl.
CPC ........... *H02K 7/1166* (2013.01); *H02K 7/081* (2013.01); *F16D 3/04* (2013.01)

(58) Field of Classification Search
CPC .................................................... H02K 7/1166
(Continued)

(56) References Cited

U.S. PATENT DOCUMENTS 4,125,790 A * 11/1978 Stratienko ............... F16D 21/06
251/129.03
6,491,131 B1 * 12/2002 Appleyard ........... B62D 5/0409
180/444

(Continued)

FOREIGN PATENT DOCUMENTS

JP 51123451 U 10/1976
JP H11193827 A 7/1999
(Continued)

OTHER PUBLICATIONS

International Search Report corresponding to Application No. PCT/JP2014/054997; dated May 20, 2014, with English translation.

*Primary Examiner* — Jeremy Luks
(74) *Attorney, Agent, or Firm* — Cantor Colburn LLP

(57) ABSTRACT

A motor device may include a motor including a motor shaft protruded from a motor main body; a worm gear connected with the motor shaft through a transmission mechanism and is formed with a spiral groove; and a worm wheel engaged with the worm gear. The transmission mechanism may include a transmission member to transmit rotation of the motor shaft to the worm gear. One end face on the motor main body side of the worm gear and an end face on a worm gear side of the transmission member may be formed with two protruded parts protruded toward the other of the end faces, and a recessed part engaged with the protruded parts is formed in the other of the end faces. A compression coil spring may disposed between the worm gear and the transmission member between the two protruded parts.

12 Claims, 10 Drawing Sheets

(58) Field of Classification Search
USPC .......................................................... 310/83
See application file for complete search history.

(56) References Cited

U.S. PATENT DOCUMENTS

| | | | | |
|---|---|---|---|---|
| 6,667,562 B1* | 12/2003 | Heinrich | ................ | H02K 11/38 |
| | | | | 180/289 |
| 7,100,734 B2* | 9/2006 | Segawa | ................ | B62D 5/0409 |
| | | | | 180/444 |
| 2002/0195893 A1* | 12/2002 | Kobayashi | ........... | B62D 5/0409 |
| | | | | 310/83 |
| 2003/0155824 A1* | 8/2003 | Adachi | ................... | F16D 7/022 |
| | | | | 310/78 |
| 2004/0211619 A1* | 10/2004 | Yoneda | ................ | B62D 5/0403 |
| | | | | 180/444 |
| 2004/0245040 A1* | 12/2004 | Eda | ...................... | B62D 5/0409 |
| | | | | 180/444 |
| 2006/0086559 A1* | 4/2006 | Segawa | ................... | B62D 1/16 |
| | | | | 180/444 |
| 2006/0117889 A1* | 6/2006 | Segawa | ................ | B62D 5/0409 |
| | | | | 74/425 |
| 2007/0251757 A1* | 11/2007 | Segawa | ................ | B62D 5/0409 |
| | | | | 180/444 |
| 2008/0245636 A1* | 10/2008 | Gotou | ................... | H02K 7/108 |
| | | | | 192/48.3 |

FOREIGN PATENT DOCUMENTS

| | | | |
|---|---|---|---|
| JP | 2002145082 A | 5/2002 | |
| JP | 2002167904 A | 6/2002 | |
| JP | 2006029400 A | 2/2006 | |
| JP | 2011064327 A | 3/2011 | |
| WO | 2012160622 A1 | 11/2012 | |

* cited by examiner

MOTOR DEVICE

CROSS REFERENCE TO PRIOR APPLICATIONS

This is the U.S. national stage of application No. PCT/JP2014/054997, filed on Feb. 28, 2014. Priority under 35 U.S.C. §119(a) and 35 U.S.C. §365(b) is claimed from Japanese Application No. 2013-038071, filed Feb. 28, 2013, the disclosures of which are incorporated herein by reference.

FIELD OF THE INVENTION

The present invention relates to a motor device in which rotation of a motor is transmitted through a worm gear.

BACKGROUND

In a motor device in which rotation of a motor is transmitted through a worm gear, a structure has been proposed that a compression coil spring is disposed between a rotation shaft and the worm gear (see, Patent Literatures 1 and 2). More specifically, in Patent Literature 1, a structure has been proposed that a compression coil spring is provided around a shaft which is located between an end part on a motor main body side of a worm gear and a connecting means connected with a motor shaft. In Patent Literature 2, a structure has been proposed that a recessed part is formed on an end face located on a motor main body side of a worm gear and a compression coil spring is provided between a bottom part of the recessed part and a motor shaft. The recessed part is formed shallow so as not to reach to a portion whose outer peripheral face is formed with a spiral groove.

PATENT LITERATURE

[PTL 1] Japanese Patent Laid-Open No. 2000-152559
[PTL 2] Japanese Patent No. 4085802

In the motor devices described in Patent Literatures 1 and 2, in order to absorb deviation of a center axial line of the worm gear from a center axial line of the motor shaft when the motor and the worm gear are individually mounted in manufacture of the motor device, it is preferable to provide a coupling which is relatively movable in a direction perpendicular to the axial line direction. However, when such a structure is adopted, it is difficult to secure a space for disposing the compression coil spring.

SUMMARY

In view of the problem described above, at least an embodiment of the present invention provides a motor device which is capable of disposing a compression coil spring for urging a worm gear in an axial line direction even when a coupling is provided between the worm gear and the motor shaft.

In order to attain the above, at least an embodiment of the present invention provides a motor device including a motor having a motor shaft protruded from a motor main body, a worm gear which is connected with the motor shaft through a transmission mechanism and is formed with a spiral groove on its outer peripheral face, and a worm wheel which is engaged with the worm gear. The transmission mechanism includes a transmission member for transmitting rotation of the motor shaft to the worm gear at a position facing an end face on a motor main body side of the worm gear in an axial line direction of the worm gear, and one of the end face on the motor main body side of the worm gear and an end face on a worm gear side of the transmission member is formed with two protruded parts which are protruded at positions separated in a radial direction toward the other of the end faces. In addition, a recessed part engaged with the protruded part is formed in the other of the end faces and a compression coil spring is disposed between the worm gear and the transmission member so that the compression coil spring is disposed between the two protruded parts.

In at least an embodiment of the present invention, the transmission member which structures a coupling in which two protruded parts are fitted into a recessed part is provided on the motor main body side with respect to the worm gear and thus, when a motor and a worm gear are individually mounted in manufacture of the motor device, deviation of a center axial line of the worm gear from a center axial line of a motor shaft can be absorbed by the coupling. Further, a compression coil spring is disposed between the worm gear and the transmission member and the compression coil spring urges the worm gear to an opposite side to the motor main body side. Therefore, a position in the axial line direction of the worm gear is restricted and influence of a force in the thrust direction applied to the worm gear can be absorbed by the compression coil spring. In addition, the compression coil spring is disposed between two protruded parts structuring the coupling. Therefore, even when the coupling is provided between the worm gear and the transmission member, the compression coil spring can be disposed.

In at least an embodiment of the present invention, it is preferable that a spring arrangement hole which is extended from the end face on the motor main body side of the worm gear in the axial line direction of the worm gear is formed in an inside of the worm gear and the compression coil spring is disposed in the inside of the spring arrangement hole. According to this structure, even when a long compression coil spring whose winding number is large is used, the entire or a substantially entire compression coil spring is accommodated in an inside of the worm gear and thus a space between the motor shaft and the worm gear can be made narrow.

In at least an embodiment of the present invention, it is preferable that the spring arrangement hole is coaxially formed with the worm gear.

In at least an embodiment of the present invention, it is preferable that the worm gear is made of resin, the inside of the worm gear is formed with a communicating hole which is in communication with the spring arrangement hole and is extended in the axial line direction on an opposite side to the motor main body side with respect to the spring arrangement hole, and an inner diameter of the communicating hole is smaller than an inner diameter of the spring arrangement hole. According to this structure, wall thickness of the worm gear can be made thin and thus lowering of molding accuracy due to shrinking of resin at the time of molding can be suppressed.

In at least an embodiment of the present invention, it is preferable that a sum of a dimension in the axial line direction of the spring arrangement hole and a dimension in the axial line direction of the communicating hole is longer than a dimension in the axial line direction of the compression coil spring.

In at least an embodiment of the present invention, it is preferable that a ring-shaped step part which is formed in a connected portion of the spring arrangement hole with the communicating hole is formed to be a spring receiving face which receives an end part of the compression coil spring on an opposite side to the motor main body side, and a width in a radial direction of the spring receiving face is wider than a difference between a diameter of the compression coil spring and an inner diameter of the spring arrangement hole. According to this structure, even when a position of the compression coil spring is displaced in the radial direction, the compression coil spring maintains an abutted state with the spring receiving face and is hard to enter into the communicating hole. Accordingly, the compression coil spring can be restrained from being inclined.

In at least an embodiment of the present invention, a structure may be adopted that, when the worm gear is viewed in the radial direction, a part of the spring arrangement hole is overlapped with a range where the spiral groove and the worm wheel are engaged with each other. According to this structure, lowering of molding accuracy due to shrinking of resin at the time of molding can be suppressed in a range where the spiral groove and the worm wheel are engaged with each other.

In at least an embodiment of the present invention, a structure may be adopted that, when the worm gear is viewed in the radial direction, the spring receiving face is located on the motor main body side relative to a range where the spiral groove and the worm wheel are engaged with each other. According to this structure, rigidity of a portion where the spiral groove and the worm wheel are engaged with each other can be increased.

In at least an embodiment of the present invention, it is preferable that the motor device includes a side pressure application mechanism which presses the worm gear toward an opposite side to a side where the worm wheel is located. According to this structure, the worm gear and the worm wheel can be appropriately engaged with each other.

In at least an embodiment of the present invention, it is preferable that the side pressure application mechanism is provided at an end part of the worm gear on an opposite side to the motor main body side. According to this structure, the side pressure application mechanism can be provided in a portion with a margin in space.

In at least an embodiment of the present invention, it is preferable that the side pressure application mechanism includes a thrust bearing which is obliquely inclined with respect to the axial line direction and supports the end part of the worm gear on the opposite side to the motor main body side. According to this structure, side pressure can be applied to the worm gear with simple structure.

In at least an embodiment of the present invention, it is preferable that the motor device includes two motor side radial bearings which rotatably support the motor shaft in the motor main body and two worm gear side radial bearings which rotatably support the worm gear. According to this structure, when the motor device is to be manufactured, the motor and the worm gear can be mounted individually.

In at least an embodiment of the present invention, it is preferable that the motor device includes two motor side radial bearings which rotatably support the motor shaft in the motor main body and two worm gear side radial bearings which rotatably support the worm gear and, when the worm gear is viewed in the radial direction, the worm gear side radial bearing located on the motor main body side of the two worm gear side radial bearings is provided at a position overlapping with the spring arrangement hole. According to this structure, the worm gear side radial bearing located on the motor main body side supports a position where molding accuracy is hard to be lowered due to shrinking of resin at the time of molding.

In at least an embodiment of the present invention, it is preferable that the worm gear side radial bearing located on the motor main body side of the two worm gear side radial bearings is further separated from a region where the spiral groove and the worm wheel are engaged with each other, compared with the worm gear side radial bearing located on an opposite side to the motor main body side.

In at least an embodiment of the present invention, the transmission member which structures a coupling in which two protruded parts are fitted into a recessed part is provided on the motor main body side with respect to the worm gear and thus, deviation of the shaft centers of the motor shaft and the worm gear can be absorbed by the coupling. Further, a compression coil spring is disposed between the worm gear and the transmission member and the compression coil spring urges the worm gear to an opposite side to the motor main body side. Therefore, a position in the axial line direction of the worm gear is restricted and influence of a force in the thrust direction applied to the worm gear can be absorbed by the compression coil spring. In addition, the compression coil spring is disposed between two protruded parts structuring the coupling. Therefore, even when the coupling is provided between the worm gear and the transmission member, the compression coil spring can be disposed.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DESCRIPTION OF EMBODIMENTS

Embodiments of a motor device to which the present invention is applied will be described below with reference to the accompanying drawings.

First Embodiment (Entire Structure)

Figure 1:
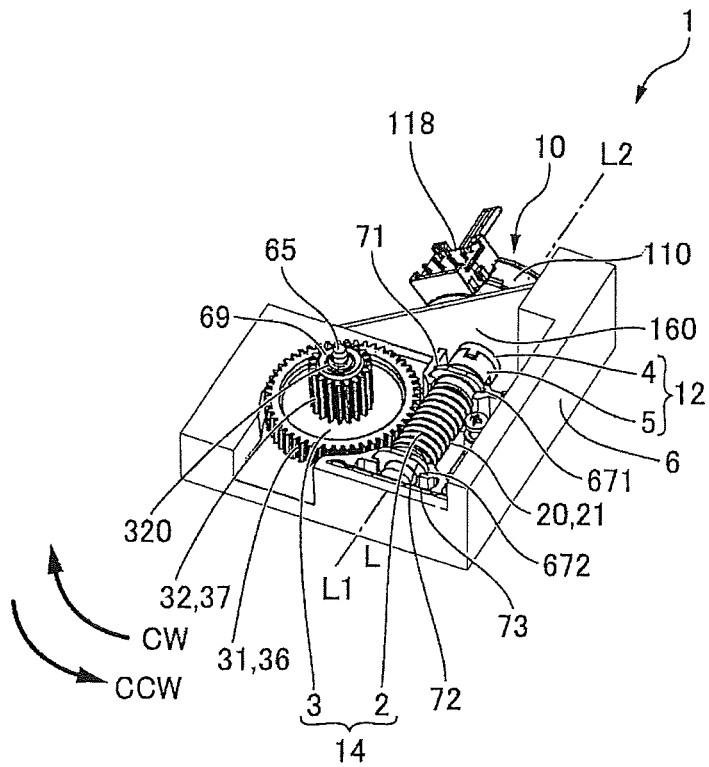
FIG. 1 is a perspective view showing a motor device in accordance with a first embodiment of the present invention.
Figure 2:
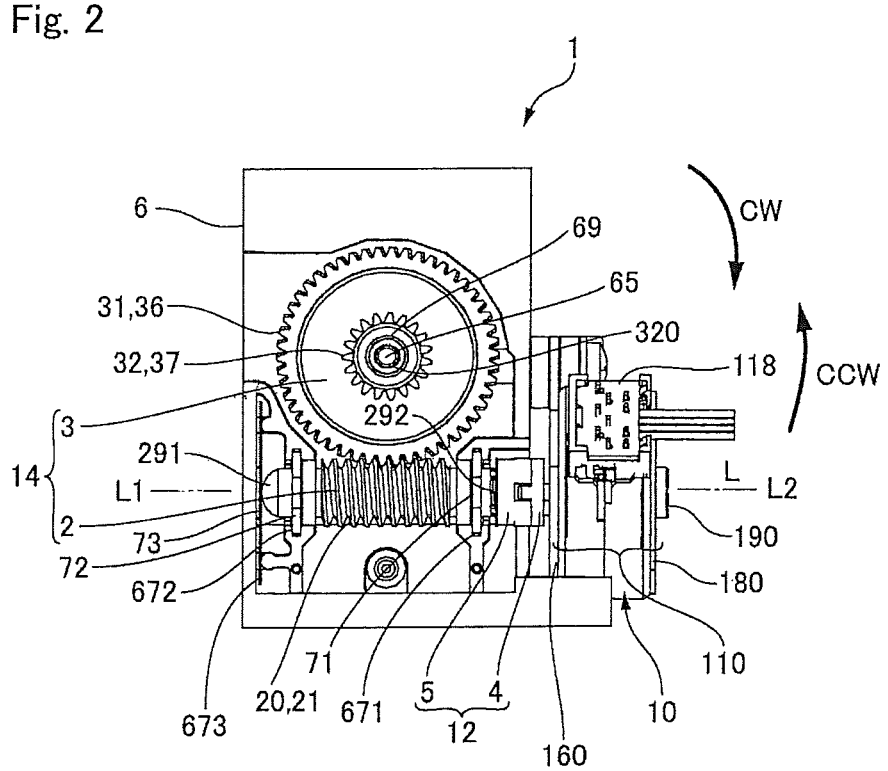
FIG. 2 is a plan view showing the motor device in accordance with the first embodiment of the present invention.

FIG. 1 is a perspective view showing a motor device in accordance with a first embodiment of the present invention. FIG. 2 is a plan view showing the motor device in accordance with the first embodiment of the present invention.

A motor device 1 shown in FIGS. 1 and 2 includes a motor 10 as a drive source, a gear mechanism 14 for transmitting rotation of the motor 10, a moved member (not shown) to which rotation of the motor 10 is transmitted through the gear mechanism 14, and a frame 6 on which the motor 10, the gear mechanism 14, the moved member and the like are mounted, and the motor device 1 moves a driven member or the like which is mounted on or connected with the moved member.

The gear mechanism 14 includes a worm gear 2 to which rotation of the motor 10 is transmitted and a worm wheel 3 which is engaged with the worm gear 2. A spiral groove 21 is formed on an outer peripheral face 20 of the worm gear 2 and a teeth part 36 engaged with the spiral groove 21 of the worm gear 2 is formed in a large diameter part 31 of the worm wheel 3. The worm wheel 3 is provided with a small diameter part 32 which is concentric with the large diameter part 31 and a teeth part 37 is formed on an outer peripheral face of the small diameter part 32. The small diameter part 32 is formed with a shaft hole 320 into which a support shaft 65 stood up from the frame 6 is fitted and the worm wheel 3 is rotatable with the support shaft 65 as a center. A helical gear is preferably used as the worm wheel 3. In this embodiment, a washer 69 is fitted to a tip end part of the support shaft 65 and coming-off of the worm wheel 3 from the support shaft 65 is prevented by the washer 69.

In the motor device 1 described above, when rotation of the motor 10 is transmitted to the worm wheel 3 through the worm gear 2, the worm wheel 3 is rotated in a clockwise direction "CW" or in a counterclockwise direction "CCW" with the support shaft 65 as a center.

(Structure of Motor 10)

Figure 3:
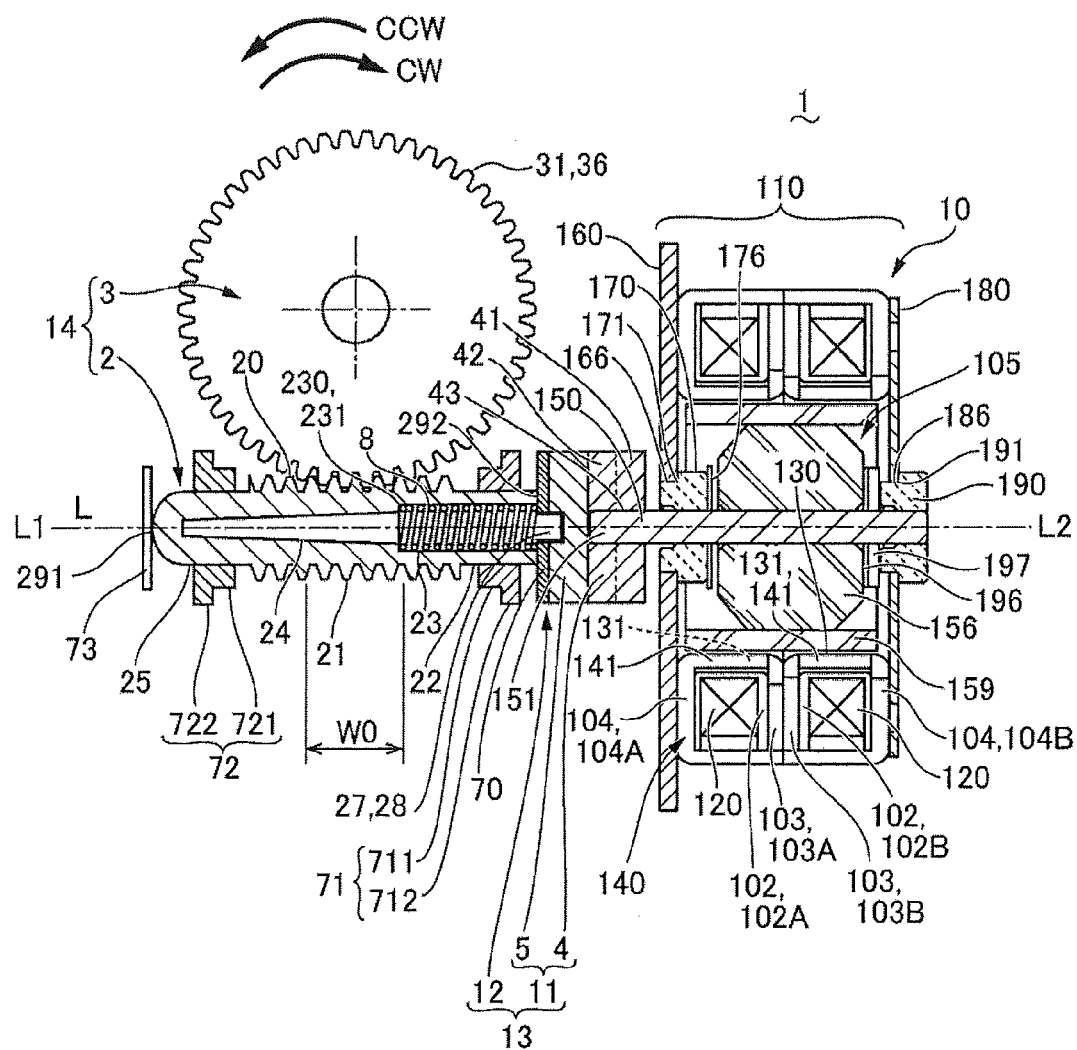
FIG. 3 is a cross-sectional view showing a structure of a motor and the like used in the motor device in accordance with the first embodiment of the present invention.

FIG. 3 is a cross-sectional view showing a structure of the motor 10 and the like used in the motor device 1 in accordance with the first embodiment of the present invention. In the following description, in a motor axial line direction "L" (axial line direction of the worm gear 2), a side where a motor shaft 150 is protruded from a motor main body 110 is referred to as an output side "L1" and a side opposite to the side where the motor shaft 150 is protruded from the motor main body 110 is referred to as an opposite-to-output side "L2".

As shown in FIG. 3, the motor 10 is a stepping motor which is formed in a shape that a motor shaft 150 is protruded from the motor main body 110 formed in a cylindrical shape. The motor main body 110 is provided with a stator 140 formed in a cylindrical tube shape and the stator 140 is structured so that an "A"-phase stator and a "B"-phase stator are superposed on each other in the motor axial line direction "L". Therefore, in the stator 140, two ring-shaped coil bobbins 102 (first coil bobbin 102A and second coil bobbin 102B) around which a coil wire 120 is wound are disposed so as to be superposed on each other in the motor axial line direction "L", and an inner stator core 103 and an outer stator core 104 are disposed so as to be superposed on the respective coil bobbins 102. More specifically, an inner stator core 103A in a ring shape and an outer stator core 104A whose cross section is a "U"-shape are disposed so as to be superposed on both sides of the first coil bobbin 102A in the motor axial line direction "L", and an inner stator core 103B in a ring shape and an outer stator core 104B whose cross section is a "U"-shape are disposed so as to be superposed on both sides of the second coil bobbin 102B in the motor axial line direction "L". A plurality of pole teeth 131 and 141 of the inner stator cores 103A and 103B and the outer stator cores 104A and 104B are structured so as to be adjacently disposed to each other in a circumferential direction on inner peripheral faces of the first coil bobbin 102A and the second coil bobbin 102B. In this manner, the cylindrical shaped stator 140 provided with a rotor arrangement opening 130 is structured and a rotor 105 is coaxially disposed on an inner side in a radial direction of the stator 140. In this embodiment, the outer stator cores 104A and 104B are formed in a "U"-shape in cross section and the outer stator cores 104A and 104B are respectively extended to outer sides in the radial direction with respect to the coil wire 120 to structure a motor case. Further, a terminal block (not shown) is integrally formed with the coil bobbin 102 (first coil bobbin 102A and second coil bobbin 102B) and a circuit board 118 is connected with terminals held by the terminal block.

The motor shaft 150 is extended in the motor axial line direction "L" in the rotor 105. A cylindrical shaped bushing 156 is fixed at a position on an opposite-to-output side "L2" of the motor shaft 150 and a cylindrical shaped permanent magnet 159 is fixed on an outer peripheral face of the bushing 156 with an adhesive or the like. In this state, an outer peripheral face of the permanent magnet 159 faces the pole teeth 131 and 141 of the stator 140 through a predetermined distance.

An end plate 160 is fixed to an output side "L1" of the stator 140 by a method of welding or the like, and the end plate 160 is formed with a hole 166 to which a radial bearing 170 (motor side radial bearing) on the output side for the motor shaft 150 is fitted and holes 167 for attaching the motor 10 to the frame 6. In this embodiment, a step part 171 is formed on an outer peripheral face of the radial bearing 170 and the step part 171 is abutted with a face on an opposite-to-output side "L2" of the end plate 160 and thereby movement to the output side "L1" of the radial bearing 170 is restricted.

A circular ring-shaped washer 176 is attached to the motor shaft 150 between the radial bearing 170 and the bushing 156. In the motor 10 structured as described above, a movable range to the output side "L1" of the motor shaft 150 is restricted by the radial bearing 170. In this embodiment, the washer 176 may be omitted.

A plate 180 is fixed to the stator 140 on its opposite-to-output side "L2" by a method of welding or the like and the plate 180 is formed with a hole 186 to which a radial bearing 190 (motor side radial bearing) on the opposite-to-output side "L2" for the motor shaft 150 is fitted. In this embodiment, a step part 191 is formed on an outer peripheral face of the radial bearing 190 and the step part 191 is abutted with a face on the opposite-to-output side "L2" of the plate 180 and thereby movement to the output side "L1" of the radial bearing 190 is restricted.

Circular ring-shaped washers 196 and 197 are attached to the motor shaft 150 between the radial bearing 190 and the bushing 156 and the washer 197 located on the opposite-to-output side "L2" is contacted with an end face on the output side "L1" of the radial bearing 190. In the motor 10 structured as described above, a movable range to the opposite-to-output side "L2" of the motor shaft 150 is restricted by the radial bearing 190. In this embodiment, one piece of washer may be used instead of using two washers 196 and 197.

(Connecting Structure of Motor Shaft 150 with Worm Gear 2)

Figure 4A:
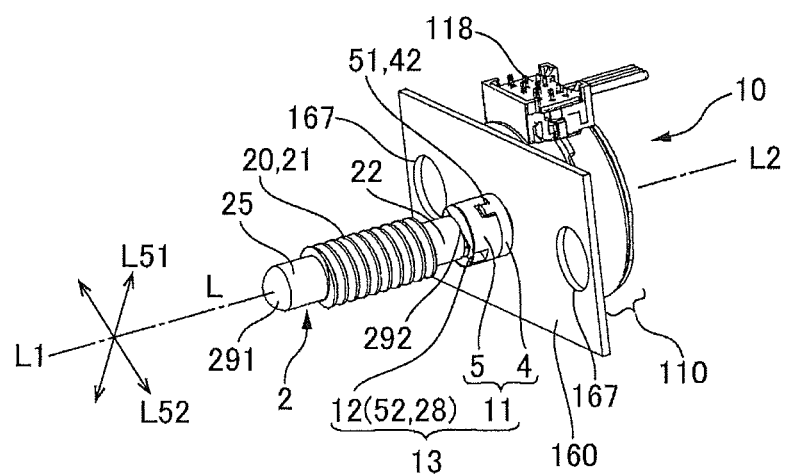
FIGS. 4A and 4B are explanatory views showing a connecting portion of the motor with a worm gear in the motor device in accordance with the first embodiment of the present invention which is viewed from an output side of the motor.
Figure 4B:
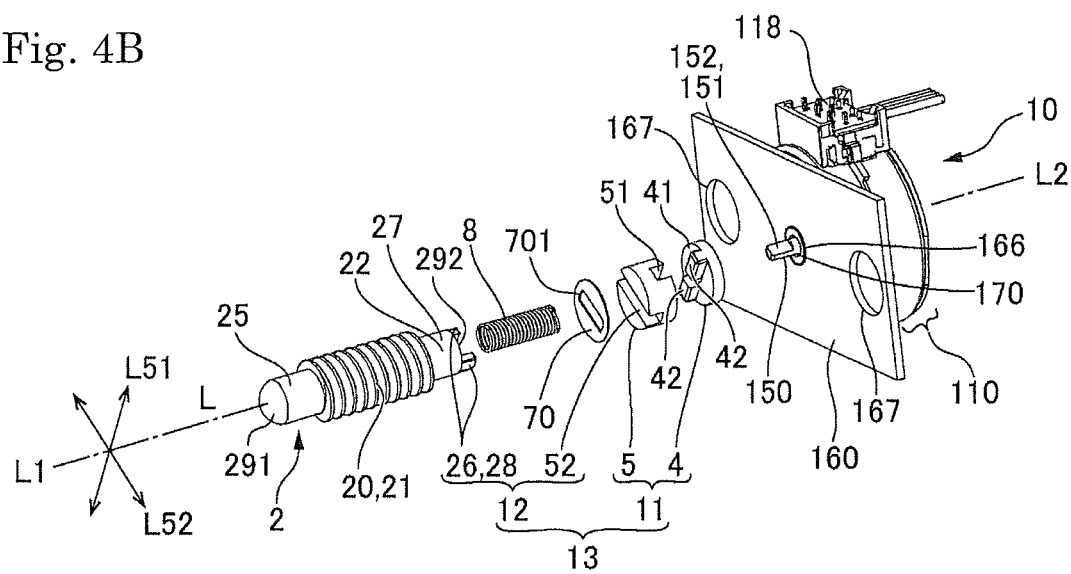
Figure 5A:
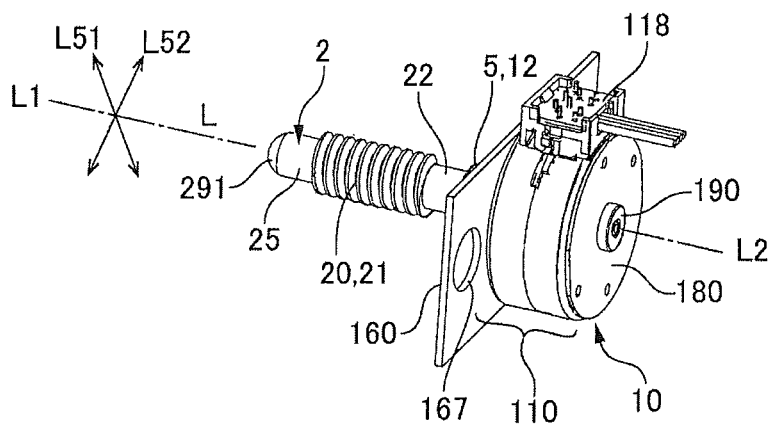
FIGS. 5A and 5B are explanatory views showing the connecting portion of the motor with the worm gear in the motor device in accordance with the first embodiment of the present invention which is viewed from an opposite-to-output side of the motor.
Figure 5B:
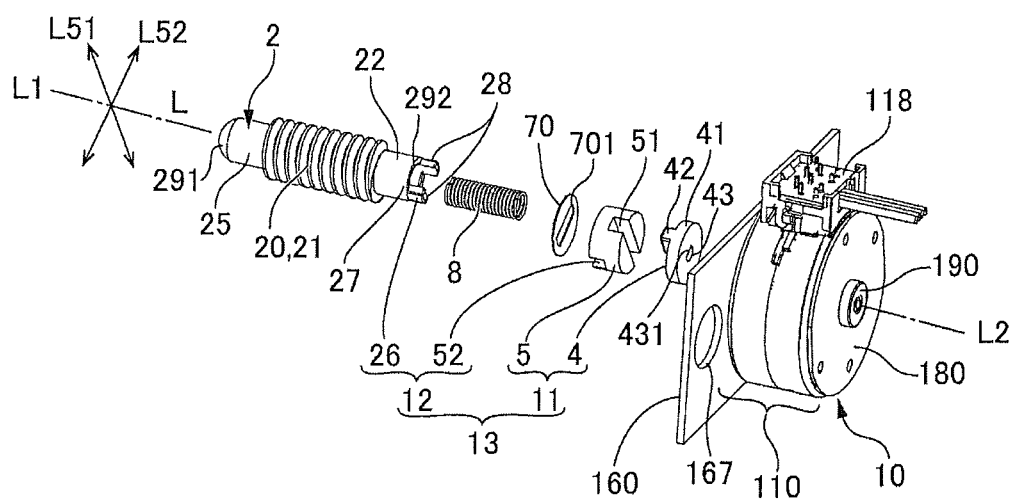
Figure 6A:
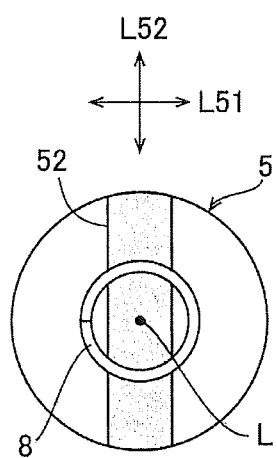
FIGS. 6A, 6B and 6C are explanatory views showing a transmission member which is used in the motor device in accordance with the first embodiment of the present invention.
Figure 6B:
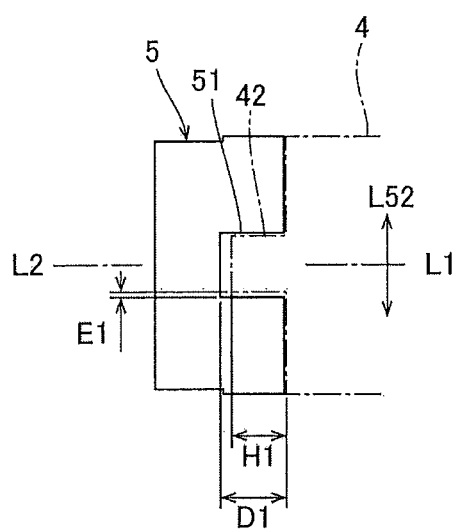
Figure 6C:
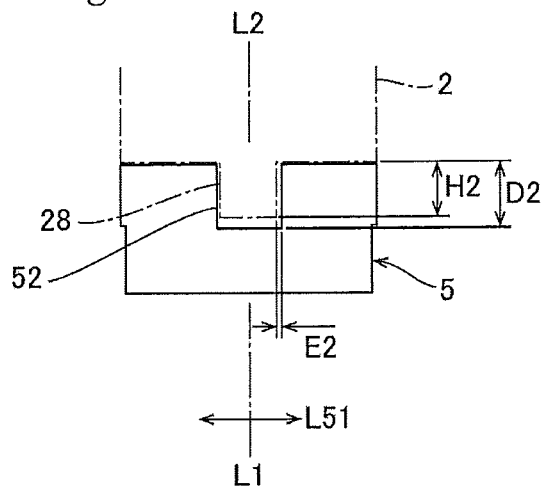

FIGS. 4A and 4B are explanatory views showing a connecting portion of the motor 10 with a worm gear 2 in the motor device 1 in accordance with the first embodiment of the present invention which is viewed from the output side "L1" of the motor 10. FIG. 4A is a perspective view showing the connecting portion of the motor 10 with the worm gear 2 and FIG. 4B is its exploded perspective view. FIGS. 5A and 5B are explanatory views showing the connecting portion of the motor 10 with the worm gear 2 in the motor device 1 in accordance with the first embodiment of the present invention which is viewed from the opposite-to-output side "L2" of the motor 10. FIG. 5A is a perspective view showing the connecting portion of the motor 10 with the worm gear 2 and FIG. 5B is its exploded perspective view. FIGS. 6A, 6B and 6C are explanatory views showing a transmission member 5 which is used in the motor device 1 in accordance with the first embodiment of the present invention. FIG. 6A is an explanatory view showing a positional relationship between an end face on a worm gear 2 side of the transmission member 5 and a compression coil spring 8, FIG. 6B is an explanatory view showing a first recessed part, and FIG. 6C is an explanatory view showing a second recessed part. In FIG. 6A, the second recessed part 52 is shown as a gray region.

As shown in FIG. 3, FIGS. 4A and 4B and FIGS. 5A and 5B, the motor shaft 150 of the motor 10 and the worm gear 2 are connected with each other through a coupling 13 (transmission mechanism) and the coupling 13 is formed in a two-stage structure comprised of a first coupling 11 and a second coupling 12.

More specifically, in the first coupling 11, a motor side coupling part 4 (drive side coupling part) is connected with an end part 151 (tip end part) of the motor shaft 150 on an opposite side to the motor main body 110, and a transmission member 5 (driven side coupling member) which is connected with the motor side coupling part 4 is connected with an end part 27 on a motor main body 110 side of the worm gear 2. Therefore, the motor shaft 150 and the worm gear 2 are connected with each other through the motor side coupling part 4 and the transmission member 5.

The motor side coupling part 4 is provided with a disk part 41 and a first protruded part 42 which is protruded from an end face of the disk part 41 on an opposite side to the motor main body 110 toward the opposite side to the motor main body 110. A shaft hole 43 is formed at a center of the motor side coupling part 4 and an end part 151 of the motor shaft 150 is fitted into the shaft hole 43. In this embodiment, a part in a circumferential direction of the end part 151 of the motor shaft 150 is formed with a flat face 152 and, on the other hand, a part in a circumferential direction of an inner peripheral face of the shaft hole 43 is formed with a flat face 431. As a result, idling between the motor side coupling part 4 and the motor shaft 150 is prevented by overlapping the flat faces 152 and 431 with each other. The shaft hole 43 is penetrated through the disk part 41 and the first protruded part 42 and the first protruded part 42 is divided into two first protruded parts 42 in its length direction by the shaft hole 43.

The transmission member 5 is formed in a substantially cylindrical solid shape and its end face on the motor main body 110 side is formed with a first recessed part 51 in a groove shape over the entire region in the radial direction to which the first protruded part 42 of the motor side coupling part 4 is fitted.

In the first coupling 11 structured as described above, the first recessed part 51 is extended over the entire region in the radial direction and the two first protruded parts 42 are fitted to both ends of the first recessed part 51. Therefore, a loss when rotation of the motor side coupling part 4 is transmitted to the transmission member 5 is small. Further, an extended direction of the first recessed part 51 and a direction where the two first protruded parts 42 are arranged are a first direction "L51" which is perpendicular to the motor axial line direction "L" and the motor side coupling part 4 and the transmission member 5 are relatively movable to each other in the first direction "L51".

In order to structure the second coupling 12, an end face of the transmission member 5 opposite to the motor main body 110 side is formed with a second recessed part 52 in a groove shape over the entire region in the radial direction, and the end part 27 of the worm gear 2 is formed with a worm gear side coupling part 26 which is fitted to the second recessed part 52. The second coupling 12 is structured of the second recessed part 52 and the worm gear side coupling part 26. The worm gear side coupling part 26 is comprised of two second protruded parts 28 which are protruded from positions separated in the radial direction of an end face 292 on the motor main body 110 side of the worm gear 2 toward an end face on the worm gear 2 side of the transmission member 5, and the two second protruded parts 28 are fitted to both ends of the second recessed part 52.

In this embodiment, a spring arrangement hole 23 is formed in an inside of the worm gear 2 so as to be coaxial with the worm gear 2 and the spring arrangement hole 23 is opened in the end face 292 on the motor main body 110 side. Therefore, the two second protruded parts 28 protruded toward the motor main body 110 side are formed on the end face 292 of the worm gear 2 at two positions separated by 180° in the circumferential direction around the opening of the spring arrangement hole 23, and the two second protruded parts 28 are fitted to the second recessed part 52 of the transmission member 5. Therefore, as described below, in a state that the compression coil spring 8 is disposed in the spring arrangement hole 23, the compression coil spring 8 is located between the two second protruded parts 28.

In the second coupling 12 structured as described above, the second recessed part 52 is extended over the entire region in the radial direction and the two second protruded parts 28 are fitted to both ends of the second recessed part 52 and thus a loss when rotation of the transmission member 5 is transmitted to the worm gear 2 is small. Further, an extended direction of the second recessed part 52 and a direction where the two second protruded parts 28 are arranged are a second direction "L52" which is perpendicular to the motor axial line direction "L" and intersecting the first direction "L51" and the worm gear side coupling part 26 and the transmission member 5 are relatively movable to each other in the second direction "L52".

In this embodiment, angular directions around the axial line of the first direction "L51" (extended direction of the first recessed part 51 and direction where two first protruded parts 42 are arranged) and the second direction "L52" (extended direction of the second recessed part 52 and direction where two second protruded parts 28 are arranged) are shifted by 90°. Therefore, the direction (first direction "L51") where the transmission member 5 is movable with respect to the motor side coupling part 4 and the direction (second direction "L52") where the transmission member 5 is movable with respect to the worm gear side coupling part 26 are perpendicular to each other.

In the motor device 1 structured as described above, when the motor shaft 150 of the motor 10 is rotated, the motor side coupling part 4 of the first coupling 11 is rotated and rotation of the motor side coupling part 4 is transmitted to the transmission member 5 through the first protruded part 42 and the first recessed part 51. Further, rotation of the transmission member 5 is transmitted to the worm gear 2 through the second recessed part 52 and the second protruded part 28 in the second coupling 12. In this embodiment, the motor side coupling part 4 is made of resin and the transmission member 5 is an elastic member comprised of rubber or the like. Therefore, vibration occurred when the motor shaft 150 is rotated is capable of being absorbed by the transmission member 5.

In this embodiment, as shown in FIGS. 6A, 6B and 6C, a height "H2" in the motor axial line direction "L" of the second protruded part 28 of the worm gear side coupling part 26 is smaller than a depth "D2" in the motor axial line direction "L" of the second recessed part 52 of the transmission member 5. Further, a difference between the height "H2" of the second protruded part 28 and the depth "D2" of the second recessed part 52 is larger than a movable distance "E2" in the second recessed part 52 of the second protruded part 28 in the first direction "L51" perpendicular to the second direction "L52". Further, a height "H1" in the motor axial line direction "L" of the first protruded part 42 of the motor side coupling part 4 is smaller than a depth "D1" in the motor axial line direction "L" of the first recessed part 51 of the transmission member 5, and a difference between the height "H1" of the first protruded part 42 and the depth "D1" of the first recessed part 51 is larger than a movable distance "E1" in the first recessed part 51 of the first protruded part 42 in the second direction "L52" perpendicular to the first direction "L51".

(Structure of Worm Gear 2 and Compression Coil Spring 8)

As shown in FIG. 3, FIGS. 4A and 4B and FIGS. 5A and 5B, in the motor device 1 in this embodiment, an outer peripheral face 20 of the worm gear 2 is provided with regions 22 and 25 where the spiral groove 21 is not formed on both sides in the motor axial line direction "L" with respect to a region where the spiral groove 21 is formed. The worm gear 2 is rotatably supported by radial bearings 71 and 72 (worm gear side radial bearing) at the regions 22 and 25 where the spiral groove 21 is not formed. The radial bearings 71 and 72 are respectively provided with cylindrical tube parts 711 and 721 and flange parts 712 and 722 enlarged at end parts of the cylindrical tube parts 711 and 721, and the flange parts 712 and 722 are held by grooves 671 and 672 (see FIGS. 1 and 2) of the frame 6. An end part 291 of the worm gear 2 on an opposite side to the motor main body 110 is formed in a hemisphere face and the end part 291 of the worm gear 2 is supported by a thrust bearing 73 formed in a plate shape which is held by a groove 673 of the frame 6.

In this embodiment, a compression coil spring 8 for urging the worm gear 2 toward an opposite side to the motor main body 110 side and for urging the transmission member 5 toward the motor side coupling part 4 is disposed between the worm gear 2 and the motor shaft 150 by utilizing the spring arrangement hole 23 formed in the worm gear 2. As a result, the compression coil spring 8 urges the motor shaft 150 to the motor main body 110 side through the transmission member 5 and the motor side coupling part 4.

More specifically, in the inside of the worm gear 2, the spring arrangement hole 23 is formed from the end face 292 on the motor main body 110 side of the worm gear 2 in a deep hole which reaches to a portion whose outer peripheral face is formed with the spiral groove 21, and the compression coil spring 8 is disposed in the inside of the spring arrangement hole 23. In this state, one end (opposite side to the motor main body 110) of the compression coil spring 8 is abutted with a step part 231 formed in the depth of the spring arrangement hole 23, and the other end (motor main body 110 side) of the compression coil spring 8 is abutted with the transmission member 5. Therefore, the compression coil spring 8 is disposed between the transmission member 5 and the end part of the worm gear 2 on the opposite side to the transmission member 5.

In this embodiment, a spacer 70 formed with an opening part 701 in a groove shape which is overlapped with the second recessed part 52 is disposed on a face of the transmission member 5 on an opposite side to the motor main body 110. The other end (motor main body 110 side) of the compression coil spring 8 urges the transmission member 5 through the spacer 70. As a result, the compression coil spring 8 urges the worm gear 2 toward an opposite side (output side "L1") to the motor main body 110 side and urges the motor shaft 150 toward the motor main body 110 side (opposite-to-output side "L2") through the spacer 70 and the coupling 12 (transmission member 5 and motor side coupling part 4). In this embodiment, the spacer 70 is made of a stainless steel plate.

The two second protruded parts 28 of the worm gear 2 located on an outer side in the radial direction with respect to the compression coil spring 8 are connected with the motor shaft 150 through the coupling 13 and an inner side with respect to the compression coil spring 8 is formed to be a hollow portion where a shaft part or the like is not existed.

In this embodiment, the worm gear 2 is made of resin and a communicating hole 24 is extended in an axial line direction (motor axial line direction "L") in the inside of the worm gear 2 so as to be in communication with the spring arrangement hole 23 on an opposite side to the end face 292 with respect to the spring arrangement hole 23. Therefore, an excessive thick portion is not existed in the worm gear 2. Further, as shown in FIG. 3, when the worm gear 2 is viewed in the radial direction, a part of the spring arrangement hole 23 is overlapped with a range "W0" where the spiral groove 21 and the worm wheel 3 are engaged with each other. A sum of a dimension in the motor axial line direction "L" of the spring arrangement hole 23 and a dimension in the motor axial line direction "L" of the communicating hole 24 is longer than a dimension in the motor axial line direction "L" of the compression coil spring 8. The communicating hole 24 is formed in a tapered hole and its inner diameter dimension is continuously reduced from a side where the end face 292 is located as separated from the end face 292. In this embodiment, the worm gear 2 is made of POM (polyacetal resin).

The communicating hole 24 is, similarly to the spring arrangement hole 23, coaxially formed with the worm gear 2 and an inner diameter of the communicating hole 24 is smaller than an inner diameter of the spring arrangement hole 23. Therefore, the step part 231 of the spring arrangement hole 23 which is formed in a connected portion with the communicating hole 24 is formed in a ring-shaped step part and the step part 231 (ring-shaped step part) is formed as a spring receiving face 230 which receives an end part of the compression coil spring 8 on an opposite side to the motor main body 110 side. A width in the radial direction of the spring receiving face 230 is wider than a difference between a diameter of the compression coil spring 8 and an inner diameter of the spring arrangement hole 23.

(Principal Effects in this Embodiment)

As described above, in the motor device 1 in this embodiment, the compression coil spring 8 is disposed between the motor shaft 150 and the worm gear 2 and the compression coil spring 8 urges the worm gear 2 to an opposite side to the motor main body 110 side and urges the motor shaft 150 to the motor main body 110 side. Therefore, the position in the axial line direction (motor axial line direction "L") of the worm gear 2 is restricted and, when a torque is transmitted, influence of a force in a thrust direction applied to the worm gear 2 from the worm wheel 3 can be absorbed by the compression coil spring 8. For example, the compression coil spring 8 urges the motor shaft 150 and the coupling 12 toward the motor main body 110 side (opposite-to-output side "L2"). Therefore, in a case that the worm gear 2 drives the worm wheel 3 in the counterclockwise direction CCW or, in a case that a pressing force in the clockwise direction CW is applied to the worm wheel 3 by a moved member (not shown), although a pressing force toward the output side "L1" is acted on the worm gear 2, influence of the pressing force can be absorbed by the compression coil spring 8. Accordingly, rattling in the thrust direction of the motor shaft 150 and the coupling 13 is hard to be occurred and thus occurrence of vibration and abnormal noise can be suppressed. Further, the compression coil spring 8 urges the worm gear 2 toward the thrust bearing 73 which is disposed on an opposite side (output side "L1") to the motor main body 110. Therefore, in a case that the worm gear 2 drives the worm wheel 3 in the clockwise direction CW or, in a case that a pressing force in the counterclockwise direction CCW is applied to the worm wheel 3 by a moved member (not shown), although a pressing force toward the opposite-to-output side "L2" is acted on the worm gear 2, influence of the pressing force can be absorbed by the compression coil spring 8. Accordingly, a state that the worm gear 2 and the thrust bearing 73 are abutted with each other can be maintained. As a result, rattling in the thrust direction of the worm gear 2 is hard to be occurred and thus occurrence of vibration and abnormal noise can be suppressed.

Further, the compression coil spring 8 is disposed in the spring arrangement hole 23 which is formed from the end face 292 of the worm gear 2 on the motor main body 110 side so as to reach to a portion whose outer peripheral face is formed with the spiral groove 21. Therefore, even when a long compression coil spring 8 whose winding number is large is disposed between the motor shaft 150 and the worm gear 2, the entire compression coil spring 8 is accommodated in the inside of the spring arrangement hole 23 and the compression coil spring 8 is disposed between the transmission member 5 and the end part of the worm gear 2 on the opposite side to the transmission member 5. Accordingly, a space between the motor shaft 150 and the worm gear 2 can be made narrow. In other words, a spring constant of a compression coil spring 8 whose winding number is large becomes stable but its length becomes long. However, like this embodiment, when the compression coil spring 8 is disposed in the inside of the spring arrangement hole 23 which reaches to a portion whose outer peripheral face is formed with the spiral groove 21, even in a case that a long compression coil spring 8 is used, a space between the motor shaft 150 and the worm gear 2 can be made narrow.

Further, an outer peripheral face of the compression coil spring 8 is surrounded by an inner peripheral face of the spring arrangement hole 23 and thus, when the compression coil spring 8 is compressed, the compression coil spring 8 is prevented from being displaced to an outer side. Therefore, an urging direction of the compression coil spring 8 is hard to be deviated from the motor axial line direction "L".

Further, the second protruded parts 28 of the worm gear 2 which are located on an outer side in the radial direction with respect to the compression coil spring 8 are connected with the motor shaft 150 through the coupling 13 and thus, an inner side with respect to the compression coil spring 8 is set in a hollow state where a shaft part or the like is not existed. Therefore, a diameter dimension of the compression coil spring 8 can be made small and thus, spring pressure can be increased in a small space.

Further, the worm gear 2 is made of resin and, in the inside of the worm gear 2, the communicating hole 24 which is in communication with the spring arrangement hole 23 on an opposite side to the end face 292 with respect to the spring arrangement hole 23 is extended in the axial line direction (motor axial line direction "L") of the worm gear 2. Therefore, wall thickness of the worm gear 2 can be made thin and thus lowering of molding accuracy due to shrinking of resin at the time of molding can be suppressed. Accordingly, circularity of an outward shape of the worm gear 2 is high and thus, when the worm gear 2 is supported by the radial bearings 71 and 72, contact accuracy of the worm gear 2 with the radial bearings 71 and 72 is high. Therefore, since rotation of the worm gear 2 is smooth, vibration can be reduced.

Especially, in this embodiment, when the worm gear 2 is viewed in the radial direction, a part of the spring arrangement hole 23 is overlapped with a range where the spiral groove 21 and the worm wheel 3 are engaged with each other. Therefore, lowering of molding accuracy due to shrinking of resin at the time of molding can be suppressed in a range where the spiral groove 21 and the worm wheel 3 are engaged with each other.

Further, when the worm gear 2 is viewed in the radial direction, in two radial bearings 71 and 72, the radial bearing 71 located on the motor main body 110 side is provided at a position overlapping with the spring arrangement hole 23. Therefore, the radial bearing 71 supports a position where molding accuracy is hard to be lowered due to shrinking of resin at the time of molding.

Further, the ring-shaped step part 231 formed at a connected portion of the spring arrangement hole 23 with the communicating hole 24 is formed as a spring receiving face 230 which receives an end part of the compression coil spring 8, and a width in the radial direction of the spring receiving face 230 is wider than a difference between the diameter of the compression coil spring 8 and the inner diameter of the spring arrangement hole 23. Therefore, even when the position of the compression coil spring 8 is displaced in the radial direction, the compression coil spring 8 is maintained in an abutted state with the spring receiving face 230 and is hard to enter into the communicating hole 24. Accordingly, inclination of the compression coil spring 8 is suppressed.

Further, the motor side coupling part 4 connected with the transmission member 5 is connected with the end part 151 of the motor shaft 150 on the opposite side to the motor main body 110 side, and the worm gear side coupling part 26 connected with the transmission member 5 is provided at the end part on the motor main body 110 side of the worm gear 2. Therefore, even when shaft centers of the motor shaft 150 and the worm gear 2 are deviated from each other, the deviation can be absorbed by the coupling 13 (first coupling 11 and second coupling 12). Accordingly, the position of the worm gear 2 (positions of the radial bearings 71 and 72) can be set giving priority to the positional accuracy of the worm gear 2 with respect to the worm wheel 3 and thus engaging accuracy of the worm wheel 3 with the worm gear 2 is high. Therefore, transmission loss of a torque can be reduced. Further, vibration due to deviation between a center axial line of the worm gear 2 and a center axial line of the motor shaft 150 is hard to be occurred and thus vibration is hard to be transmitted to the frame 6. Further, since play is not required to provide between the motor shaft 150 and the worm gear 2, rotation of the motor shaft 150 can be transmitted to the worm gear 2 accurately. As a result, the position of a moved member can be accurately controlled by the motor 10 and thus the motor device 1 can be structured as a device for adjusting a direction of a driven member. Further, since the transmission member 5 is an elastic member, vibration can be absorbed by elasticity of the transmission member 5.

Further, even when the coupling 13 is provided, the compression coil spring 8 is disposed between two second protruded parts 28 which structure the worm gear side coupling part 26. Therefore, even when the second coupling 12 is provided between the worm gear 2 and the transmission member 5, the compression coil spring can be disposed.

Further, the transmission member 5 is urged toward the motor side coupling part 4 by the compression coil spring 8 through the spacer 70 and, as a result, the motor side coupling part 4 is urged toward the motor shaft 150. Therefore, rattling in the motor axial line direction "L" of the spacer 70 and the coupling 12 (transmission member 5 and motor side coupling part 4) is hard to occur and thus occurrence of vibration and abnormal noise can be suppressed.

Further, the extended direction (first direction "L51") of the first recessed part 51 of the transmission member 5 and the extended direction (second direction "L52") of the second recessed part 52 of the transmission member 5 are shifted by 90° in angular directions around the axial line. Therefore, shaft deviation between the motor shaft 150 and the worm gear 2 can be absorbed through respective groove directions of the first recessed part 51 and the second recessed part 52. For example, the position of the worm gear 2 is set giving priority to the positional accuracy of the worm gear 2 with respect to the worm wheel 3 and, as a result, even when shaft deviation is occurred between the worm gear 2 and the motor shaft 150, the shaft deviation can be absorbed by the respective groove directions of the first recessed part 51 and the second recessed part 52. Further, when the motor main body 110 is attached through vibration control rubber or the like, although shaft deviation is easily occurred between the worm gear 2 and the motor shaft 150, the shaft deviation can be absorbed in the respective groove directions of the first recessed part 51 and the second recessed part 52.

Further, in this embodiment, the height "H2" in the motor axial line direction "L" of the second protruded part 28 of the worm gear side coupling part 26 is smaller than the depth "D2" in the motor axial line direction "L" of the second recessed part 52 of the transmission member 5. Therefore, play is provided between the second protruded part 28 and the bottom part of the second recessed part 52 and thus occurrence of vibration and abnormal noise due to abutting of the second protruded part 28 with the bottom part of the second recessed part 52 can be suppressed. Further, the height "H1" in the motor axial line direction "L" of the first protruded part 42 of the motor side coupling part 4 is smaller than the depth "D1" in the motor axial line direction "L" of the first recessed part 51 of the transmission member 5. Therefore, play is provided between the first protruded part 42 and the bottom part of the first recessed part 51 and thus occurrence of vibration and abnormal noise due to abutting of the first protruded part 42 with the bottom part of the first recessed part 51 can be suppressed.

Further, in this embodiment, two radial bearings 170 and 190 (motor side radial bearing) which rotatably support the motor shaft 150 are provided and two radial bearings 71 and 72 (worm gear side radial bearing) which rotatably support the worm gear 2 are provided. Therefore, when the motor device 1 is to be manufactured, the motor 10 and the worm gear 2 can be mounted individually.

Second Embodiment

Figure 7:
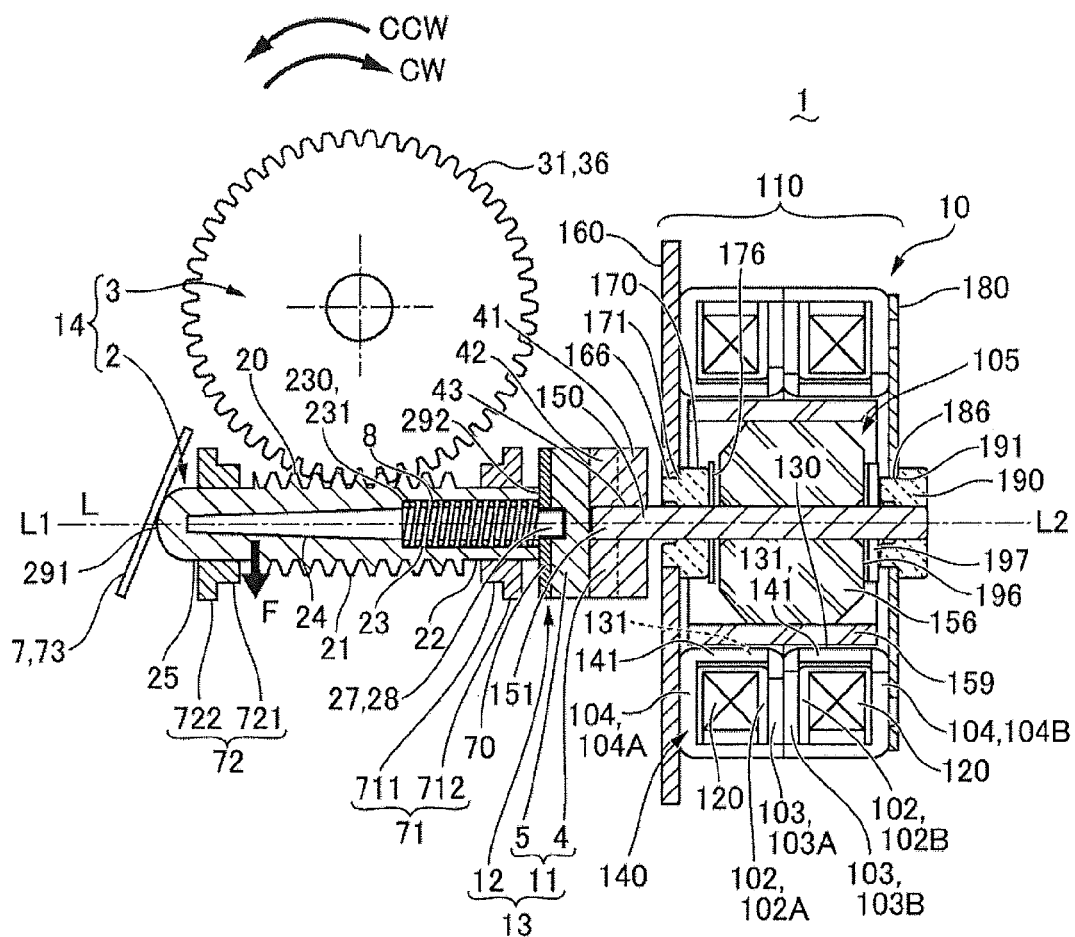
FIG. 7 is an explanatory view showing a motor device in accordance with a second embodiment of the present invention.

FIG. 7 is an explanatory view showing a motor device 1 in accordance with a second embodiment of the present invention. Basic structures of the second embodiment and embodiments described below are similar to the first embodiment and thus the same reference signs are used in common portions and their descriptions are omitted.

As shown in FIG. 7, a motor device 1 in the second embodiment includes a side pressure application mechanism 7 for generating side pressure "F" which presses the worm gear 2 toward an opposite side to a side where the worm wheel 3 is located. Therefore, the worm gear 2 and the worm wheel 3 can be appropriately engaged with each other.

In this embodiment, the side pressure application mechanism 7 is provided at the end part 291 of the worm gear 2 on an opposite side to the motor main body 110 side. More specifically, the end part 291 of the worm gear 2 is formed in a hemisphere face and the side pressure application mechanism 7 includes a thrust bearing 73 which is obliquely inclined with respect to the motor axial line direction "L" to support the end part 291 of the worm gear 2 in the motor axial line direction "L".

According to this structure, the side pressure application mechanism 7 can be provided in a portion with a margin in space where the end part 291 of the worm gear 2 is located. Further, side pressure "F" is applied to the worm gear 2 with a simple structure that the thrust bearing 73 is inclined.

Third Embodiment

Figure 8:
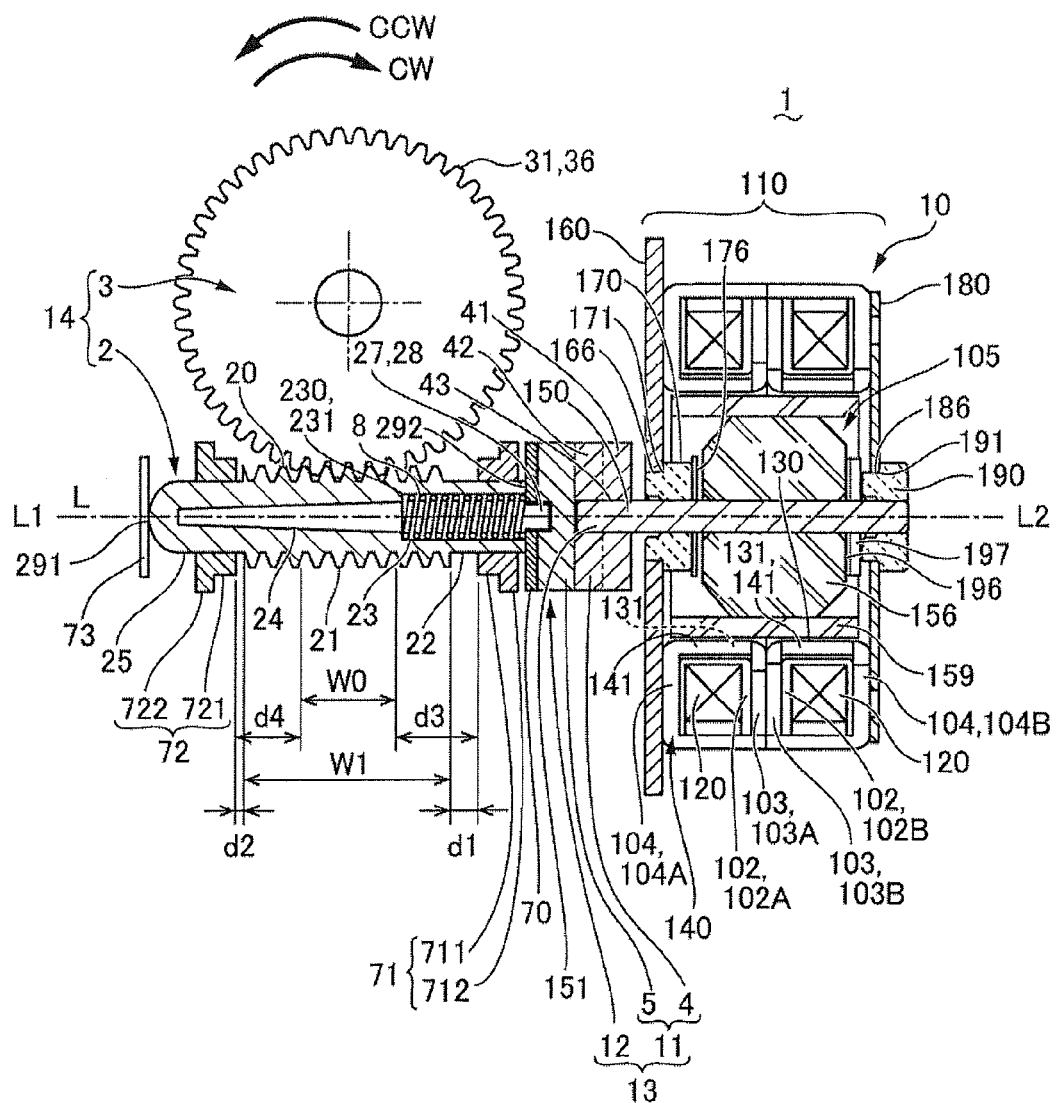
FIG. 8 is an explanatory view showing a motor device in accordance with a third embodiment of the present invention.

FIG. 8 is an explanatory view showing a motor device 1 in accordance with a third embodiment of the present invention. As shown in FIG. 8, in the third embodiment, when the worm gear 2 is viewed in the radial direction, the spring receiving face 230 is located on the motor main body 110 side relative to a range where the spiral groove 21 and the worm wheel 3 are engaged with each other. Therefore, when the worm gear 2 is viewed in the radial direction, the spring arrangement hole 23 is not overlapped with the range "W0" where the spiral groove 21 and the worm wheel 3 are engaged with each other. Accordingly, rigidity of a portion of the worm gear 2 where the spiral groove 21 and the worm wheel 3 are engaged with each other is increased.

In this embodiment, in two radial bearings 71 and 72 (worm gear side radial bearing), the radial bearing 71 located on the motor main body side is further separated from the region "W1" where the spiral groove 21 is formed compared with the radial bearing 72. In other words, a distance "d1" between the region "W1" where the spiral groove 21 is formed and the radial bearing 71 is longer than a distance "d2" between the region "W1" where the spiral groove 21 is formed and the radial bearing 72.

Further, in two radial bearings 71 and 72 (worm gear side radial bearing), the radial bearing 71 located on the motor main body side is further separated, compared with the radial bearing 72, from the region "W0" where the spiral groove 21 and the worm wheel 3 are engaged with each other. In other words, a distance "d3" between the region "W0" where the spiral groove 21 and the worm wheel 3 are engaged with each other and the radial bearing 71 is longer than a distance "d4" between the region "W0" where the spiral groove 21 and the worm wheel 3 are engaged with each other and the radial bearing 72.

Fourth Embodiment

Figure 9A:
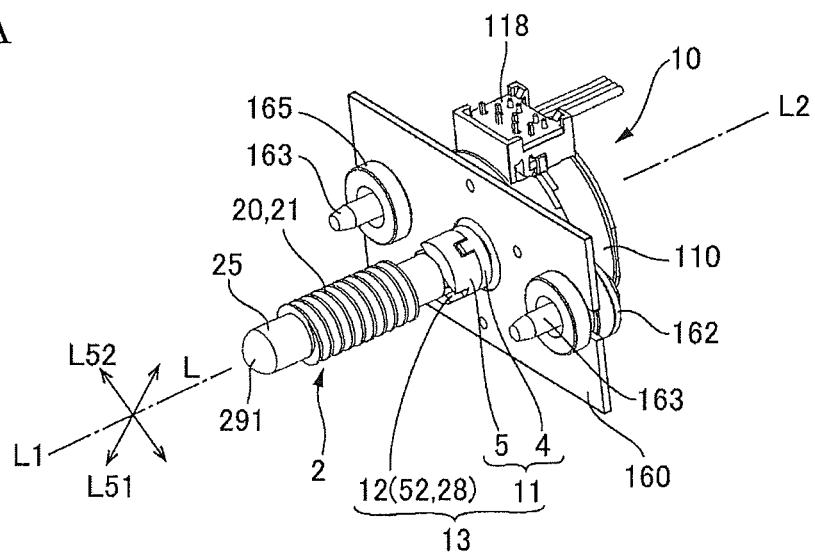
FIGS. 9A and 9B are explanatory views showing a connecting portion of a motor with a worm gear in a motor device in accordance with a fourth embodiment of the present invention which is viewed from an output side of the motor.
Figure 9B:
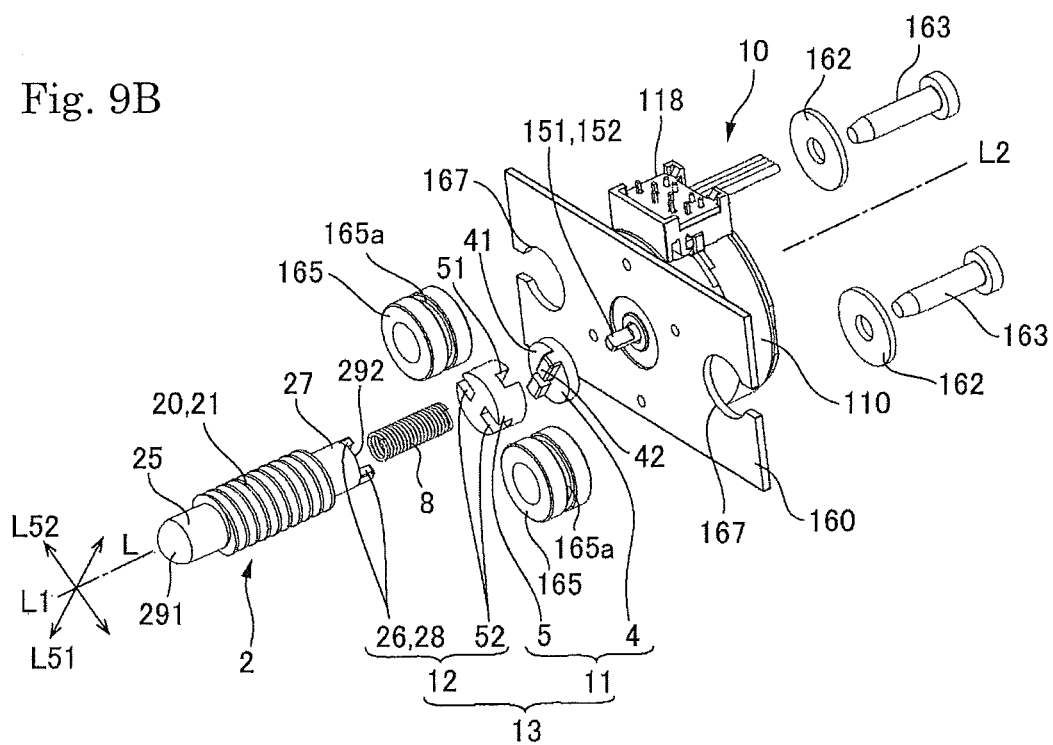
Figure 10A:
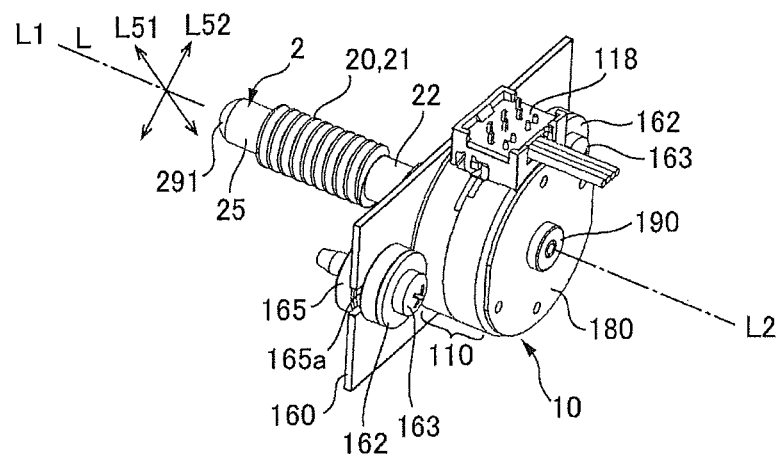
FIGS. 10A and 10B are explanatory views showing the connecting portion of the motor with the worm gear in the motor device in accordance with the fourth embodiment of the present invention which is viewed from an opposite-to-output side of the motor.
Figure 10B:
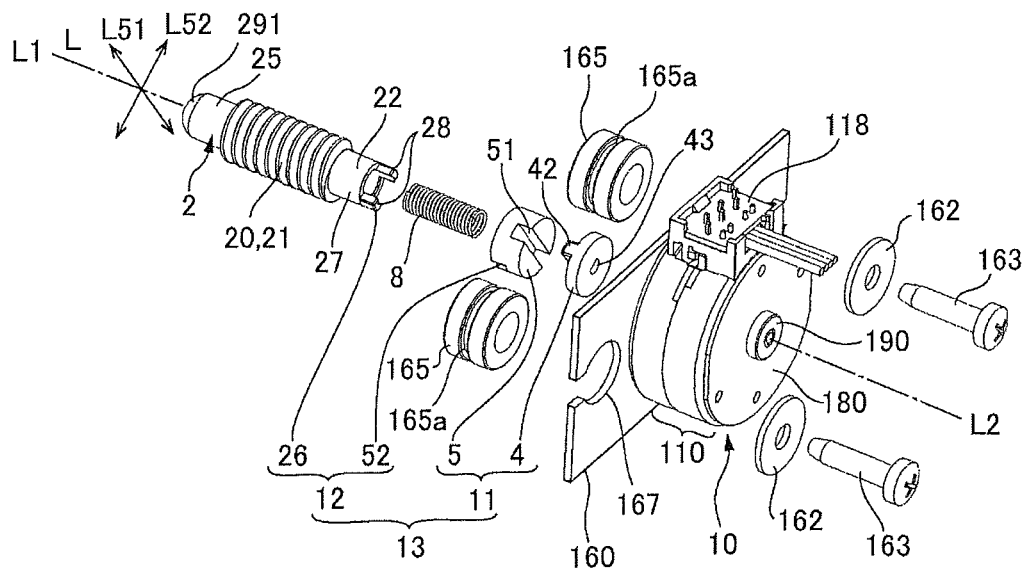
Figure 11A:
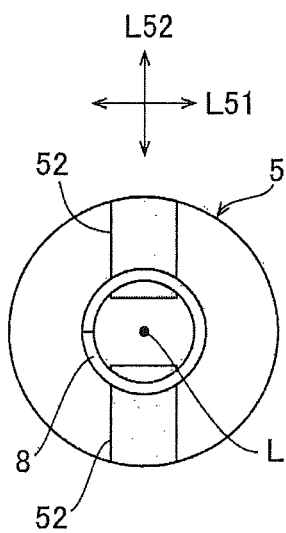
FIGS. 11A, 11B and 11C are explanatory views showing a transmission member which is used in the motor device in accordance with the fourth embodiment of the present invention.
Figure 11B:
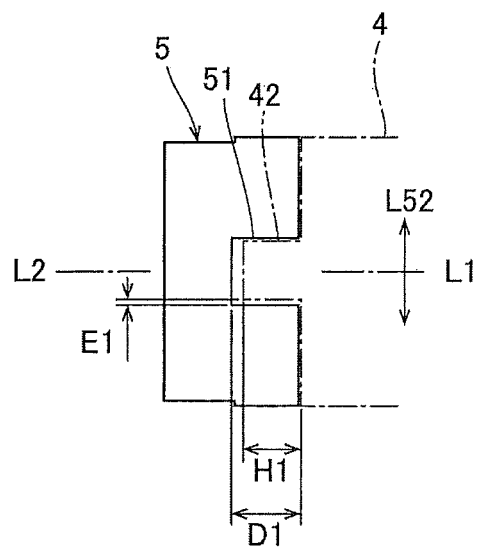
Figure 11C:
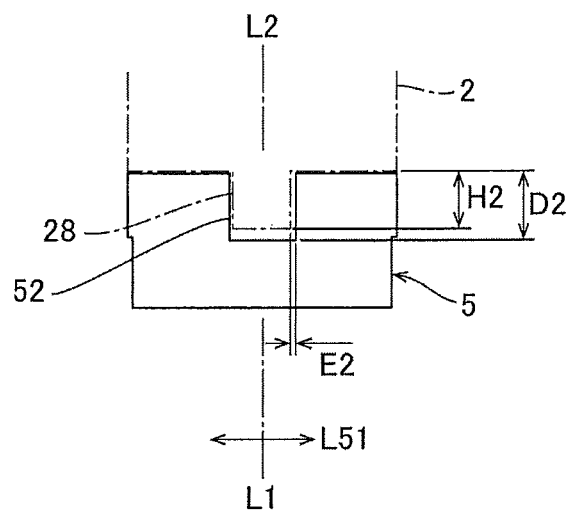

FIGS. 9A and 9B are explanatory views showing a connecting portion of a motor 10 with a worm gear 2 in a motor device 1 in accordance with a fourth embodiment of the present invention which is viewed from an output side "L1" of the motor. FIG. 9A is a perspective view showing the connecting portion of the motor 10 with the worm gear 2 and FIG. 9B is its exploded perspective view. FIGS. 10A and 10B are explanatory views showing the connecting portion of the motor 10 with the worm gear 2 in the motor device 1 in accordance with the fourth embodiment of the present invention which is viewed from an opposite-to-output side of the motor 10. FIG. 10A is a perspective view showing the connecting portion of the motor 10 with the worm gear 2, and FIG. 10B is an exploded perspective view. FIGS. 11A, 11B and 11C are explanatory views showing a transmission member 5 which is used in the motor device 1 in accordance with the fourth embodiment of the present invention. FIG. 11A is an explanatory view showing a positional relationship between an end face on the worm gear 2 side of the transmission member 5 and a compression coil spring 8, FIG. 11B is an explanatory view showing a first recessed part, and FIG. 11C is an explanatory view showing a second recessed part. In FIG. 11A, the second recessed part 52 is shown as a gray region.

As shown in FIGS. 9A and 9B and FIGS. 10A and 10B, also in the fourth embodiment, similarly to the first embodiment, a motor shaft 150 of a motor 10 and a worm gear 2 are connected with each other through a coupling 13 (transmission mechanism) and the coupling 13 is formed in a two-stage structure comprised of a first coupling 11 and a second coupling 12.

In the first coupling 11, a motor side coupling part 4 is connected with an end part 151 (tip end part) of the motor shaft 150 on an opposite side to the motor main body 110 side, and a transmission member 5 which is connected with the motor side coupling part 4 is connected with an end part 27 on the motor main body 110 side of the worm gear 2. Therefore, the motor shaft 150 and the worm gear 2 are connected with each other through the motor side coupling part 4 and the transmission member 5. The motor side coupling part 4 is provided with a first protruded part 42 which is protruded toward an opposite side to the motor main body 110. The transmission member 5 is formed with a first recessed part 51 in a groove shape over the entire region in the radial direction on an end face on the motor main body 110 side, to which the first protruded part 42 of the motor side coupling part 4 is fitted.

In the second coupling 12, an end face of the transmission member 5 on an opposite side to the motor main body 110 side is formed with a second recessed part 52 in a groove shape over the entire region in the radial direction, and the end part 27 of the worm gear 2 is formed with a worm gear side coupling part 26 which is fitted to the second recessed part 52. The worm gear side coupling part 26 is comprised of two second protruded parts 28 which are protruded from positions separated in the radial direction of an end face 292 on the motor main body 110 side of the worm gear 2 toward an end face on the worm gear 2 side of the transmission member 5, and the two second protruded parts 28 are fitted to the second recessed part 52.

A spring arrangement hole 23 is formed in an inside of the worm gear 2 so as to be coaxial with the worm gear 2 and two second protruded parts 28 protruded toward the motor main body 110 side are formed on the end face 292 of the worm gear 2 at two positions separated by 180° in the circumferential direction around an opening of the spring arrangement hole 23. Therefore, in a state that the compression coil spring 8 is disposed in the spring arrangement hole 23, the compression coil spring 8 is located between the two second protruded parts 28.

In this embodiment, the spacer 70 which is described in FIGS. 4A and 4B and the like is not provided, and one end of the compression coil spring 8 on an opposite side to the transmission member 5 side is directly abutted with the worm gear 2 in an inside of the spring arrangement hole 23 and the other end on the transmission member 5 side of the compression coil spring 8 is directly abutted with an end face on the worm gear 2 side of the transmission member 5. Therefore, in comparison with a case that another member is disposed between the compression coil spring 8 and the transmission member 5, or between the compression coil spring 8 and the worm gear 2, vibration is hard to be generated.

In this embodiment, as shown in FIGS. 9A and 9B, and FIGS. 11A, 11B and 11C, the end face on the worm gear side of the transmission member 5 is formed with two second recessed parts 52 at positions separated in the second direction "L52" across a center of the position where the compression coil spring 8 is abutted, and the second protruded part 28 formed in the worm gear 2 is fitted to each of the two second recessed parts 52. Further, the compression coil spring 8 is abutted with the transmission member 5 so as to be across the two second recessed parts 52. Therefore, the second recessed part 52 is not provided on an inner side of a portion where the compression coil spring 8 is abutted. Accordingly, even when a position of the compression coil spring 8 is displaced in the radial direction, an end part of the compression coil spring 8 is hard to be entered into the second recessed part 52. As a result, inclination of the compression coil spring 8 is suppressed.

Also in the fourth embodiment, similarly to the first embodiment, as shown in FIGS. 11A, 11B and 11C, a height "H2" in the motor axial line direction "L" of the second protruded part 28 of the worm gear side coupling part 26 is smaller than a depth "D2" in the motor axial line direction "L" of the second recessed part 52 of the transmission member 5, and a difference between the height "H2" of the second protruded part 28 and the depth "D2" of the second recessed part 52 is larger than a movable distance "E2" of the second protruded part 28 in the first direction "L51" perpendicular to the second direction "L52" in the second recessed part 52. Further, a height "H1" in the motor axial line direction "L" of the first protruded part 42 of the motor side coupling part 4 is smaller than a depth "D1" in the motor axial line direction "L" of the first recessed part 51 of the transmission member 5, and a difference between the height "H1" of the first protruded part 42 and the depth "D1" of the first recessed part 51 is larger than a movable distance "E1" of the first protruded part 42 in the second direction "L52" perpendicular to first the direction "L51" in the first recessed part 51.

In FIGS. 9A and 9B and FIGS. 10A and 10B, the motor main body 110 in this embodiment is fixed to the frame 6 shown in FIGS. 1 and 2 through elastic bodies 165 made of rubber. More specifically, an end plate 160 fixed to an output side "L1" of the motor main body 110 by a method of welding or the like is formed with attaching holes 167 to the frame 6 in a cut-out shape. Further, the elastic body 165 is formed in a cylindrical tube shape and a circumferential groove 165a is formed on its outer peripheral face at a center in the motor axial line direction "L". Therefore, in a state that the elastic body 165 is attached to the hole 167 of the end plate 160, an inner peripheral edge of the hole 167 is fitted to the circumferential groove 165a. Accordingly, after a screw 163 is passed through the elastic body 165 from an opposite-to-output side "L2" of the elastic body 165 through a washer 162 and, when the screw 163 is fastened to the frame 6, the end plate 160 is fixed to the frame 6 through the elastic body 165. Therefore, the motor main body 110 is fixed to the frame 6 through the elastic body 165 which is interposed between the frame 6 and the motor main body 110. According to this structure, vibration is hard to be transmitted to the frame 6.

Other Embodiments

In the embodiments described above, the motor side coupling part 4 is provided with the first protruded part 42 and the transmission member 5 is formed with the first recessed part 51 to which the first protruded part 42 is fitted. However, it may be structured that the transmission member 5 is provided with a first protruded part and the motor side coupling part 4 is formed with a first recessed part to which the first protruded part 42 is fitted. Further, in the embodiments described above, the worm gear side coupling part 26 is provided with the second protruded part 28 and the transmission member 5 is formed with the second recessed part 52 to which the second protruded part 28 is fitted. However, it may be structured that the transmission member 5 is provided with the second protruded part and the worm gear side coupling part 26 is formed with a second recessed part to which the second protruded part is fitted.

In the embodiment described above, the entire compression coil spring 8 is accommodated in the spring arrangement hole 23 of the worm gear 2. However, in a case that the spring arrangement hole 23 is reached to a portion whose outer peripheral face is formed with the spiral groove 21 of the worm gear 2, it may be structured that a part of the compression coil spring 8 is extended and protruded out from the spring arrangement hole 23.

In the embodiment described above, the worm gear 2 is made of resin but may be structured of other materials. Further, the worm gear 2 may be structured of a shaft and a spiral-grooved member which are made of different structural members.

Further, in the embodiment described above, a stepping motor is used as the motor 10 but a brushless motor, a motor with a brush or the like may be used.

INDUSTRIAL APPLICABILITY

According to at least an embodiment of the present invention, a motor device is provided in which a position in an axial line direction of the worm gear is restricted by a compression coil spring and influence of a force in a thrust direction which is applied to the worm gear can be absorbed by the compression coil spring. Further, the compression coil spring is disposed between two protruded parts structuring a coupling and thus a motor device having the compression coil spring is structured even when the coupling is provided between the worm gear and the transmission member.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

The invention claimed is:

1. A motor device comprising:
a motor comprising a motor shaft protruded from a motor main body;
a worm gear which is connected with the motor shaft through a transmission mechanism and is formed with a spiral groove on an outer peripheral face; and
a worm wheel which is engaged with the worm gear;
wherein the transmission mechanism comprises a transmission member structured to transmit rotation of the motor shaft to the worm gear at a position facing an end face on a motor main body side of the worm gear in an axial line direction of the worm gear;
wherein one of the end face on the motor main body side of the worm gear and an end face on a worm gear side of the transmission member is formed with two protruded parts which are protruded toward the other of the end faces at positions separated in a radial direction, and a recessed part engaged with the protruded parts is formed in the other of the end faces; and
wherein a compression coil spring is disposed between the worm gear and the transmission member so that the compression coil spring is disposed between the two protruded parts;
a spring arrangement hole which is extended from the end face on the motor main body side of the worm gear in the axial line direction of the worm gear is formed in an inside of the worm gear, and
the compression coil spring is disposed in the inside of the spring arrangement hole;
the spring arrangement hole is coaxially formed with the worm gear;
the worm gear is made of resin,
the inside of the worm gear is formed with a communicating hole which is in communication with the spring arrangement hole and is extended in the axial line direction on an opposite side to the motor main body side with respect to the spring arrangement hole, and
an inner diameter of the communicating hole is smaller than an inner diameter of the spring arrangement hole.

2. The motor device according to claim 1, wherein a sum of a dimension in the axial line direction of the spring arrangement hole and a dimension in the axial line direction of the communicating hole is longer than a dimension in the axial line direction of the compression coil spring.

3. The motor device according to claim 1, wherein
 a ring-shaped step part which is formed in a connected portion of the spring arrangement hole with the communicating hole is formed to be a spring receiving face which receives an end part of the compression coil spring on an opposite side to the motor main body side, and
 a width in a radial direction of the spring receiving face is wider than a difference between a diameter of the compression coil spring and an inner diameter of the spring arrangement hole.

4. The motor device according to claim 1, wherein when the worm gear is viewed in the radial direction, a part of the spring arrangement hole is overlapped with a range where the spiral groove and the worm wheel are engaged with each other.

5. The motor device according to claim 1, wherein when the worm gear is viewed in the radial direction, the spring receiving face is located on the motor main body side relative to a range where the spiral groove and the worm wheel are engaged with each other.

6. The motor device according to claim 1, further comprising a side pressure application mechanism structured to press the worm gear toward an opposite side to a side where the worm wheel is located.

7. The motor device according to claim 6, wherein the side pressure application mechanism is provided at an end part of the worm gear on an opposite side to the motor main body side.

8. The motor device according to claim 7, wherein the side pressure application mechanism comprises a thrust bearing which is obliquely inclined with respect to the axial line direction and supports the end part of the worm gear on the opposite side to the motor main body side.

9. The motor device according to claim 1, further comprising:
 two motor side radial bearings which rotatably support the motor shaft in the motor main body; and
 two worm gear side radial bearings which rotatably support the worm gear.

10. The motor device according to claim 1, further comprising:
 two motor side radial bearings which rotatably support the motor shaft in the motor main body; and
 two worm gear side radial bearings which rotatably support the worm gear;
 wherein when the worm gear is viewed in the radial direction, the worm gear side radial bearing located on the motor main body side of the two worm gear side radial bearings is provided at a position overlapping with the spring arrangement hole.

11. The motor device according to claim 9, wherein the worm gear side radial bearing located on the motor main body side of the two worm gear side radial bearings is further separated from a region where the spiral groove and the worm wheel are engaged with each other, compared with the worm gear side radial bearing located on an opposite side to the motor main body side.

12. A motor device comprising:
 a motor comprising a motor shaft protruded from a motor main body;
 a worm gear which is connected with the motor shaft through a transmission mechanism and is formed with a spiral groove on an outer peripheral face;
 a worm wheel which is engaged with the worm gear; and
 a side pressure application mechanism structured to press the worm gear toward an opposite side to a side where the worm wheel is located
 wherein the transmission mechanism comprises a transmission member structured to transmit rotation of the motor shaft to the worm gear at a position facing an end face on a motor main body side of the worm gear in an axial line direction of the worm gear;
 wherein one of the end face on the motor main body side of the worm gear and an end face on a worm gear side of the transmission member is formed with two protruded parts which are protruded toward the other of the end faces at positions separated in a radial direction, and a recessed part engaged with the protruded parts is formed in the other of the end faces; and
 wherein a compression coil spring is disposed between the worm gear and the transmission member so that the compression coil spring is disposed between the two protruded parts;
 wherein the side pressure application mechanism is provided at an end part of the worm gear on an opposite side to the motor main body side;
 wherein the side pressure application mechanism comprises a thrust bearing which is obliquely inclined with respect to the axial line direction and supports the end part of the worm gear on the opposite side to the motor main body side.

* * * * *